(12) United States Patent
Tamura et al.

(10) Patent No.: US 11,506,488 B2
(45) Date of Patent: Nov. 22, 2022

(54) ULTRASONIC INSPECTION SYSTEM

(71) Applicant: Hitachi-GE Nuclear Energy, Ltd., Hitachi (JP)

(72) Inventors: Akinori Tamura, Tokyo (JP); Naoyuki Kouno, Tokyo (JP)

(73) Assignee: Hitachi-GE Nuclear Energy, Ltd., Hitachi (JP)

( * ) Notice: Subject to any disclaimer, the term of this patent is extended or adjusted under 35 U.S.C. 154(b) by 613 days.

(21) Appl. No.: 16/654,688

(22) Filed: Oct. 16, 2019

(65) Prior Publication Data

US 2020/0124412 A1 Apr. 23, 2020

(30) Foreign Application Priority Data

Oct. 17, 2018 (JP) .............................. JP2018-195683

(51) Int. Cl.
*G01B 17/02* (2006.01)

(52) U.S. Cl.
CPC .................................... *G01B 17/02* (2013.01)

(58) Field of Classification Search
CPC .... G01B 17/02; G01B 17/025; G01B 21/042; G01B 17/00; G01N 21/84; G01N 29/07; G01N 2291/102; G01N 29/348; G01N 2291/02854; G01N 29/04; G01N 29/043; G01N 29/30; G01N 2291/106; G01N 22/02; G01N 2291/0289; G05B 13/028; G05B 19/042; G06V 10/82; G01L 5/246
USPC ...... 29/594; 73/1.82, 514.34, 597, 627, 634; 324/109; 702/35, 39, 48, 56, 103–104, 702/108, 127, 142, 159, 171, 183, 188
See application file for complete search history.

(56) References Cited

U.S. PATENT DOCUMENTS 6,047,602 A * 4/2000 Lynnworth ............. G01F 1/662
73/632
7,168,322 B2 * 1/2007 Bardoux ............ G01N 29/0645
73/628

(Continued)

FOREIGN PATENT DOCUMENTS

CA        2761865 A1 * 11/2010 ........... G01N 29/043
JP        2015-78910 A      4/2015
JP        2015078910 A  *   4/2015

*Primary Examiner* — Jeffrey P Aiello
(74) *Attorney, Agent, or Firm* — Crowell & Moring LLP (57) ABSTRACT

An ultrasonic inspection system includes: an ultrasonic sensor including a piezoelectric element and a calibration piece interposed between the piezoelectric element and a subject; and a control device that computes a thickness of the subject, on the basis of a difference between an ultrasonic propagation time of one round trip in the calibration piece and the subject and an ultrasonic propagation time of one round trip in the calibration piece. The calibration piece includes: a propagation portion extending along a surface of the subject, the propagation portion having the piezoelectric element adhering to an end face on one side in a direction in which the propagation portion extends; and a propagation-direction turn portion formed on another side in the direction in which the propagation portion extends, the propagation-direction turn portion having a bottom face in contact with the surface of the subject through a contact medium and an inclined face inclining with respect to a direction vertical to the surface of the subject.

2 Claims, 7 Drawing Sheets

(56) References Cited

U.S. PATENT DOCUMENTS

2016/0061778 A1\* 3/2016 Kishiro ................ G01N 29/024
                                                              73/597
2019/0064120 A1\* 2/2019 Yamamoto ......... G01N 29/0645

\* cited by examiner

ULTRASONIC INSPECTION SYSTEM

BACKGROUND OF THE INVENTION

1. Field of the Invention

The present invention relates to an ultrasonic inspection system that measures the thickness of a subject.

2. Description of the Related Art

Ultrasonic inspection that is exemplary in the technology of non-destructive inspection, has been adopted in various fields because of features such as low cost and the ease of application. For securing of the soundness of laid pipes or containers in a nuclear plant, a thermal power plant, or a chemical plant, ultrasonic inspection is regularly carried out, in which those wall thicknesses are measured. Specifically, after removal of a lagging member from a laid pipe or a container, ultrasonic inspection is carried out while an ultrasonic sensor is being pushed against previously regulated inspection points. Thus, such a lagging member requires detaching and attaching before and after inspection. If a place to be inspected is high, a scaffold requires assembling and removing before and after inspection. Because such an ultrasonic sensor is pushed against a laid pipe or a container, the ultrasonic sensor requires careful arranging such that the propagation direction of an ultrasonic wave is appropriate. Inspection of a large number of laid pipes and containers is regulated in nuclear plants, so that a large amount of labor and time are required.

Thus, for example, a technique in which an ultrasonic sensor is previously fixed to the outer face of a laid pipe under a lagging member, has been proposed. This arrangement enables ultrasonic inspection to be carried out without detachment and attachment of the lagging member. Performance of ultrasonic inspection while a plant is operating enables reduction of the load of regular inspection. However, according to the present technique, because an ultrasonic sensor is made to adhere to the outer face of a laid pipe under a lagging member, it is difficult to calibrate equipment before and after measurement, with a calibration plate prepared separately as conventionally. Thus, a method of embedding a calibration plate in an ultrasonic sensor has been disclosed (e.g., JP 2015-78910 A).

An ultrasonic measurement device in JP 2015-78910 A includes: an ultrasonic sensor fixed to the outer face of a laid pipe; and a main flaw detector. For example, as illustrated in FIG. 2 in JP 2015-78910 A, the ultrasonic sensor includes: a piezoelectric element that performs ultrasonic transmission and reception; and a calibration plate adhering to the lower face of the piezoelectric element (in other words, interposed between the piezoelectric element and the subject). The main flaw detector computes the wall thickness of the laid pipe, on the basis of the difference between the propagation time of an ultrasonic wave having reflected one time off the inner face of the laid pipe (in other words, one round trip in the calibration plate and the laid pipe) and the propagation time of an ultrasonic wave having reflected one time off the lower face of the calibration plate (in other words, one round trip in the calibration plate).

SUMMARY OF THE INVENTION

The conventional technology has the following disadvantages. For example, as illustrated in FIG. 5C in JP 2015-78910 A, in a case where the calibration plate is relatively thin, the reception timing of an ultrasonic wave having reflected two times off the lower face of the calibration plate (in other words, two round trips in the calibration plate) is earlier than the reception timing of an ultrasonic wave having reflected one time off the inner face of the laid pipe. Then, the reception timing of an ultrasonic wave having reflected a plurality of times off the lower face of the calibration plate (in other words, a plurality of round trips in the calibration plate) overlaps or is close to the reception timing of the ultrasonic wave having reflected one time off the inner face of the laid pipe. Thus, the former ultrasonic wave is likely to interfere with the latter ultrasonic wave. Therefore, although the ultrasonic sensor can be reduced in thickness, the accuracy of measurement of the laid pipe in thickness deteriorates.

Meanwhile, for example, as illustrated in FIG. 5B in JP 2015-78910 A, in a case where the calibration plate is relatively thick, the reception timing of an ultrasonic wave having reflected two times off the lower face of the calibration plate is later than the reception timing of an ultrasonic wave having reflected one time off the inner face of the laid pipe. Thus, the former ultrasonic wave does not interfere with the latter ultrasonic wave. Therefore, although the accuracy of measurement of the laid pipe in thickness can be ensured, the ultrasonic sensor is difficult to reduce in thickness.

The present invention has been made in consideration of the circumstances, and an object of the present invention is to provide an ultrasonic inspection system enabling the compatibility between reduction of an ultrasonic sensor in thickness and the accuracy of measurement of a subject in thickness, with the ultrasonic sensor in which a calibration plate is embedded.

In order to achieve the object, according to an embodiment of the present invention, provided is an ultrasonic inspection system including: an ultrasonic sensor including: a piezoelectric element configured to perform ultrasonic transmission and reception; and a calibration piece interposed between the piezoelectric element and a subject; and a control device configured to compute a thickness of the subject, based on a difference between an ultrasonic propagation time of one round trip in the calibration piece and the subject and an ultrasonic propagation time of one round trip in the calibration piece, in which the calibration piece includes: a propagation portion extending along a surface of the subject, the propagation portion having the piezoelectric element adhering to an end face on one side in a direction in which the propagation portion extends; and a propagation-direction turn portion formed on another side in the direction in which the propagation portion extends, the propagation-direction turn portion having a bottom face in contact with the surface of the subject through a contact medium and an inclined face inclining with respect to a direction vertical to the surface of the subject, an ultrasonic wave having propagating from the piezoelectric element to the propagation-direction turn portion through the propagation portion, reflects off the inclined face to propagate to the bottom face, and from the ultrasonic wave having reached the bottom face, a partial ultrasonic wave having reflected off the bottom face and a partial ultrasonic wave having made one round trip in the subject through the bottom face, reflect off the inclined face to propagate to the propagation portion.

According to an embodiment of the present invention, the compatibility between reduction of an ultrasonic sensor in thickness and the accuracy of measurement of a subject in thickness, can be achieved with the ultrasonic sensor in which a calibration piece is embedded.

DESCRIPTION OF THE PREFERRED EMBODIMENTS

A first embodiment of the present invention will be described with reference to the drawings.

Figure 1:
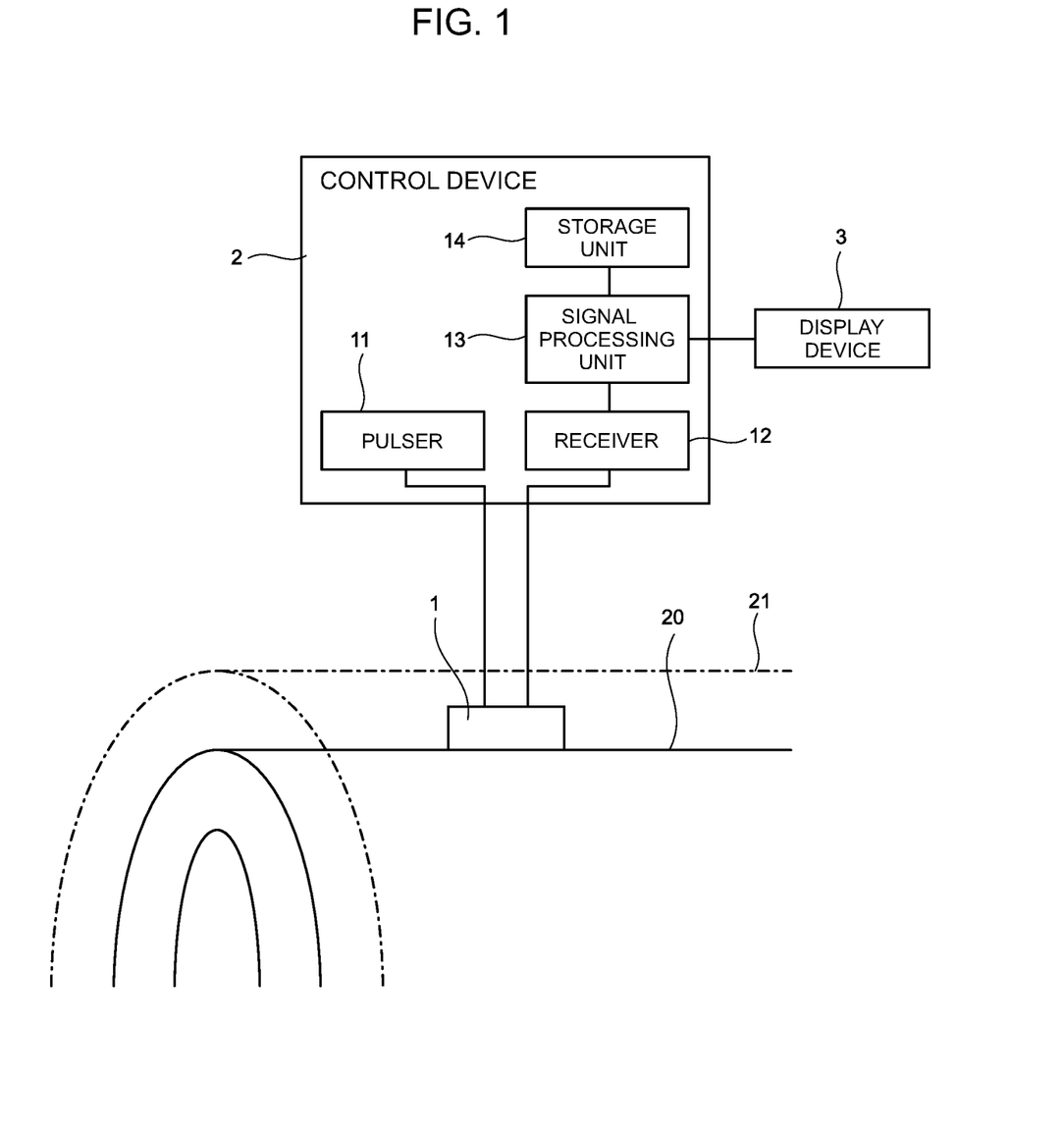
FIG. 1 is a schematic illustration of the configuration of an ultrasonic inspection system according to a first embodiment of the present invention, together with a laid pipe that is a subject.
Figure 2:
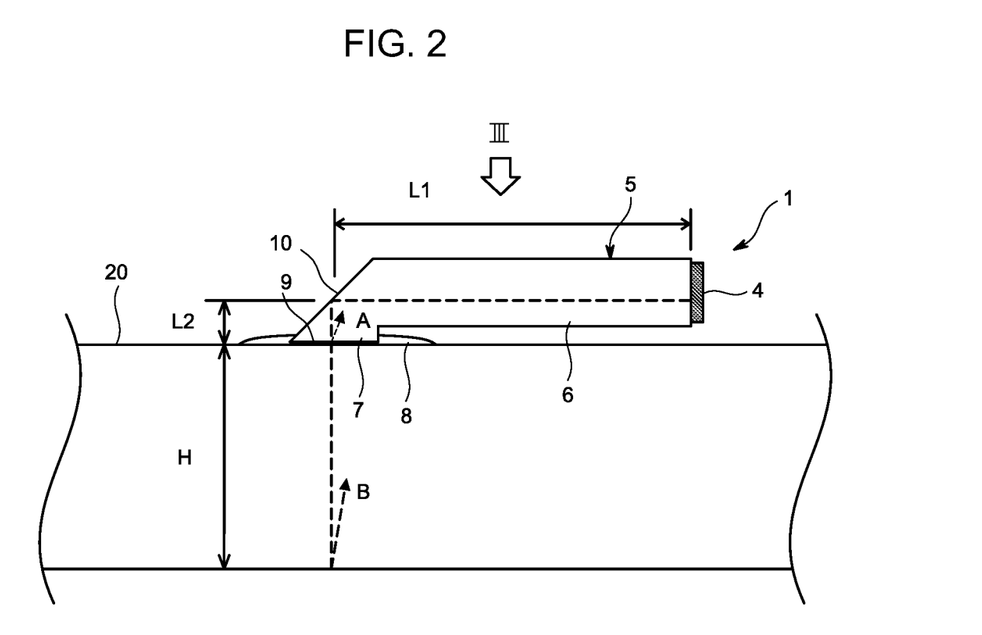
FIG. 2 is a sectional view of the structure of an ultrasonic sensor according to the first embodiment of the present invention.
Figure 3:
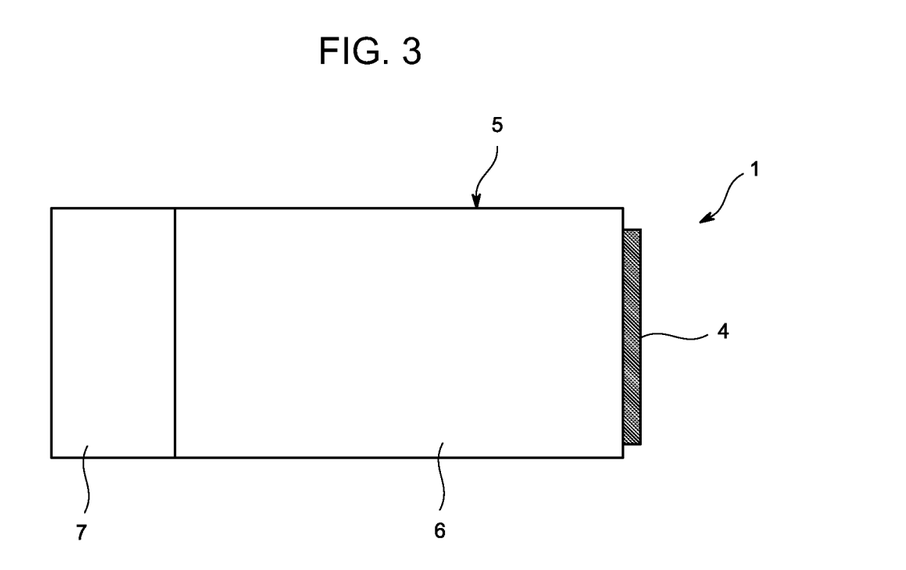
FIG. 3 is an illustration viewed along arrow III in FIG. 2.

FIG. 1 is a schematic illustration of the configuration of an ultrasonic inspection system according to the present embodiment, together with a laid pipe that is a subject. FIG. 2 is a sectional view of the structure of an ultrasonic sensor according to the present embodiment. FIG. 3 is an illustration viewed along arrow III in FIG. 2.

The laid pipe 20 that is the subject according to the present embodiment, is made of, for example, carbon steel or stainless steel. The laid pipe 20 is raised to high temperature by a flow of liquid or gas while a plant is operating. Thus, the laid pipe 20 is covered with a lagging member 21 made of, for example, calcium silicate, rock wool, glass wool, amorphous cement, or hard urethane foam.

The ultrasonic inspection system according to the present embodiment includes the ultrasonic sensor 1, a control device 2, and a display device (display) 3.

The ultrasonic sensor 1 includes a piezoelectric element 4 and a calibration piece 5 interposed between the piezoelectric element 4 and the laid pipe 20. The piezoelectric element 4 is made of piezoceramic, such as lead zirconate titanate. Preferably, the material of the calibration piece 5 is the same as the material of the laid pipe 20 (carbon steel or stainless steel). However, the material of the calibration piece 5 may be aluminum, lead, titanium, brass, or ceramic, such as alumina.

The calibration piece 5 includes a propagation portion 6 that is a quadrangular prism and a propagation-direction turn portion 7 that is a triangular prism. The propagation portion 6 extends in one direction along the outer face (surface) of the laid pipe 20 (left and right direction in FIGS. 2 and 3). The propagation portion 6 has the piezoelectric element 4 adhering to the end face on one side in the extending direction thereof (right in FIGS. 2 and 3). The propagation-direction turn portion 7 is formed on the other side in the extending direction of the propagation portion 6 (left in FIGS. 2 and 3). The propagation-direction turn portion 7 is in contact with the outer face of the laid pipe 20 through a heat-resistant adhesive (contact medium) 8. Note that, referring to FIG. 2, the propagation portion 6 is spaced apart from the outer face of the laid pipe 20, but the present embodiment is not limited to this. That is, even when the propagation portion 6 and the outer face of the laid pipe 20 are adjacent to each other, as long as extremely slight air space exists therebetween, no ultrasonic wave propagates through the air space. Thus, no contact medium should be located therebetween.

The propagation-direction turn portion 7 of the calibration piece 5 has a bottom face 9 and an inclined face 10, the bottom face 9 being in contact with the outer face of the laid pipe 20 through the heat-resistant adhesive 8, the inclined face 10 inclining with respect to the direction vertical to the outer face of the laid pipe 20. In the calibration piece 5, an ultrasonic wave having propagated from the piezoelectric element 4 to the propagation-direction turn portion 7 through the propagation portion 6, reflects off the inclined face 10 to propagate to the bottom face 9. Then, from the ultrasonic wave having reached the bottom face 9, a partial ultrasonic wave having reflected off the bottom face 9 as indicated with arrow A in FIG. 2, reflects off the inclined face 10 to propagate to the propagation portion 6. As indicated with arrow B in FIG. 2, a partial ultrasonic wave having reflected off the inner face of the laid pipe 20 through the bottom face 9 (in other words, one round trip between the outer face and the inner face of the laid pipe 20), reflects off the inclined face 10 to propagate to the propagation portion 6.

The control device 2 includes a pulser 11, a receiver 12, a signal processing unit 13, and a storage unit 14. Note that the signal processing unit 13 includes a processor that performs processing accordance with a program, and the storage unit 14 includes a hard disk and a memory.

The piezoelectric element 4 of the ultrasonic sensor 1 vibrates in the thickness direction thereof (left and right direction in FIGS. 2 and 3) due to a drive signal (electrical signal) from the pulser 11 of the control device 2, to transmit an ultrasonic wave to the calibration piece 5. The piezoelectric element 4 receives an ultrasonic wave A having reflected one time off the bottom face 9 of the calibration piece 5 as indicated with arrow A in FIG. 2 (in other words, one round trip in the propagation portion 6 and the propagation-direction turn portion 7 of the calibration piece 5) and an ultrasonic wave B having reflected one time off the inner face of the laid pipe 20 as indicated with arrow B in FIG. 2 (in other words, one round trip in the calibration piece 5 and the laid pipe 20). Then, the piezoelectric element 4 converts the received ultrasonic waves A and B into respective waveform signals (electrical signals), and then outputs the waveform signals to the receiver 12 of the control device 2.

Figure 4:
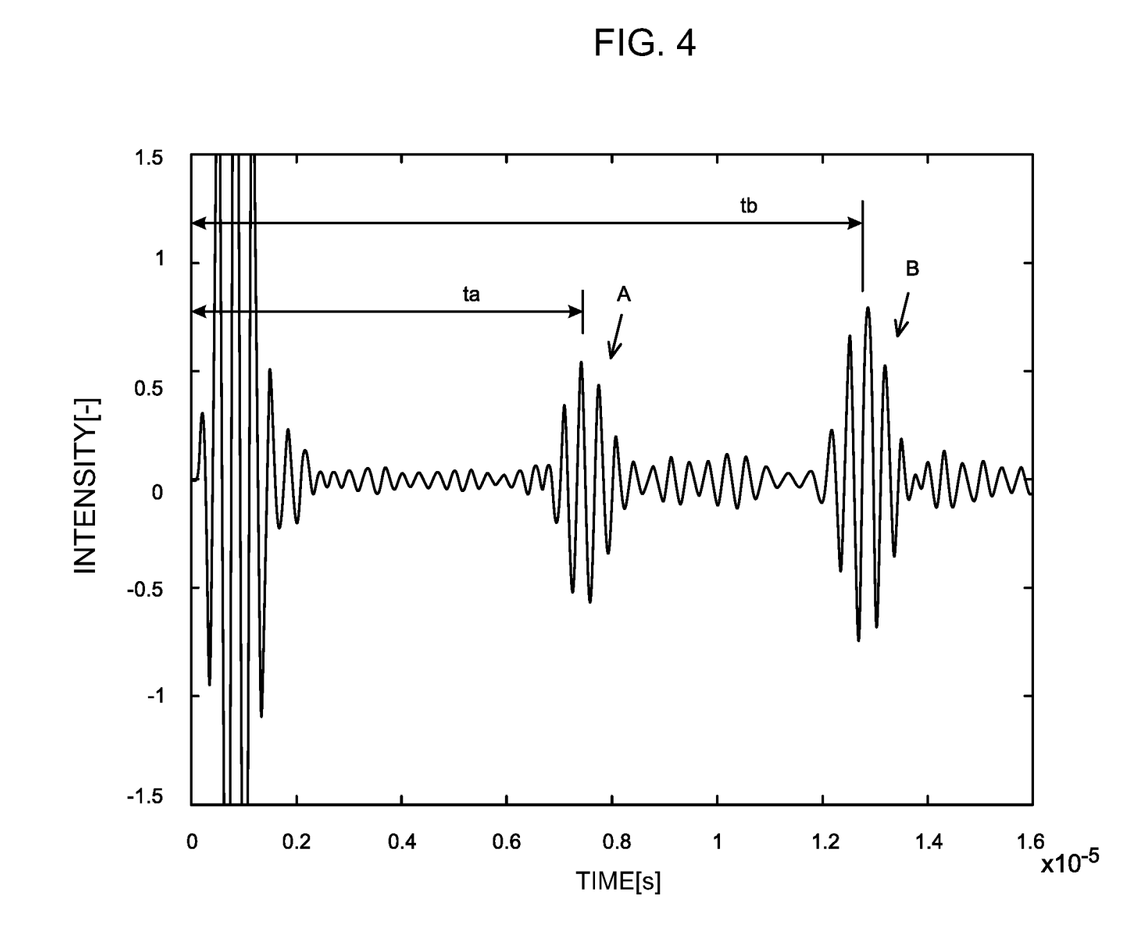
FIG. 4 is a graph of a specific exemplary received waveform according to the first embodiment of the present invention.

The signal processing unit 13 of the control device 2 performs predetermined processing to the waveform signals acquired through the receiver 12 (in detail, for example, conversion processing from an analog signal to a digital signal). This arrangement results in acquisition of waveform data of the ultrasonic waves A and B as illustrated in FIG. 4. Then, the signal processing unit 13 outputs the waveform data to the storage unit 14 for storage, and additionally outputs the waveform data to the display device 3 for display.

Figure 5:
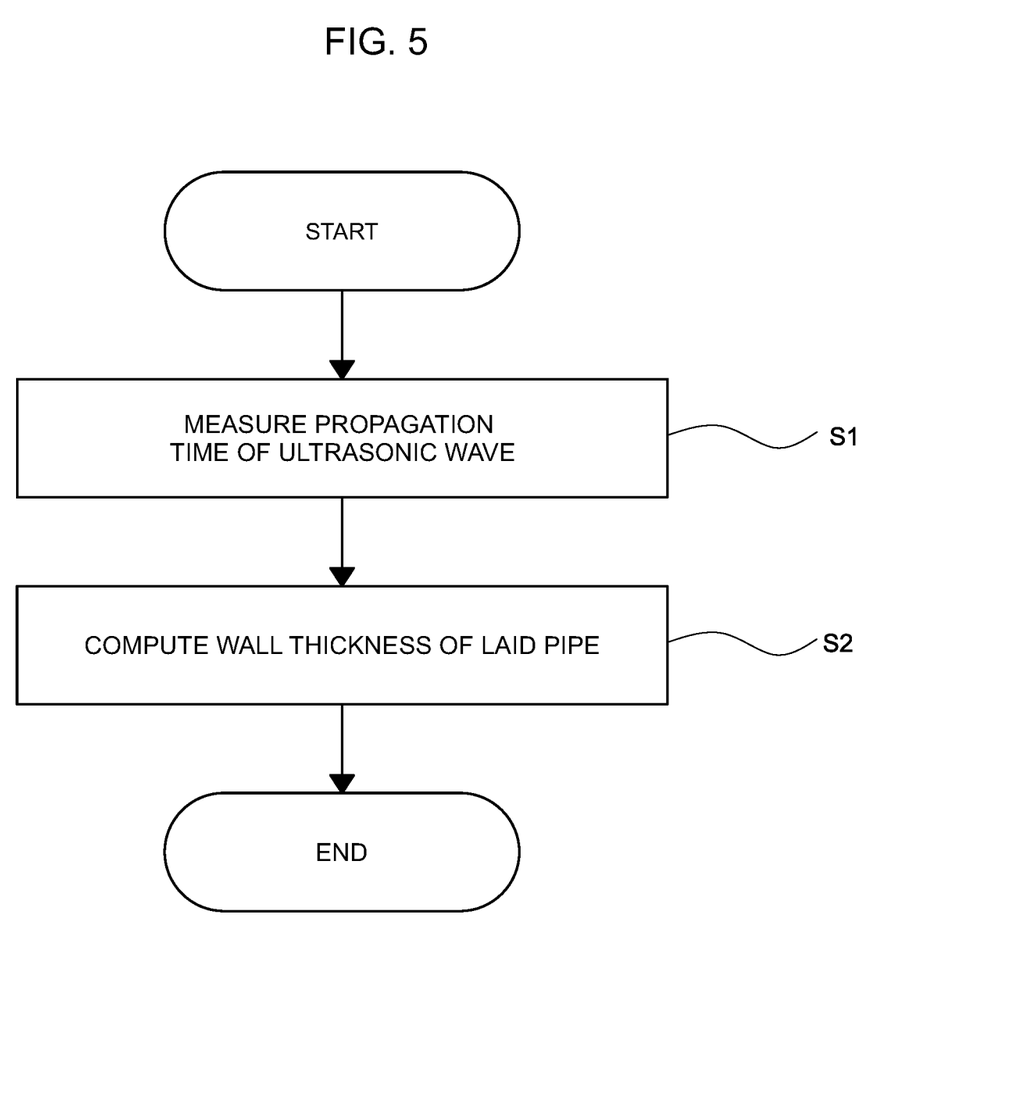
FIG. 5 is a flowchart of the processing procedure of a control device according to the first embodiment of the present invention.

The processing detail of the control device 2 according to the present embodiment will be described. FIG. 5 is a flowchart of the processing procedure of the control device 2 according to the present embodiment.

At step S1, the pulser 11 of the control device 2 outputs a drive signal to the piezoelectric element 4 of the ultrasonic sensor 1, to cause the piezoelectric element 4 to transmit an ultrasonic wave. After that, the piezoelectric element 4 receives the ultrasonic waves A and B described above. Then, the piezoelectric element 4 converts the ultrasonic waves A and B into waveform signals, and outputs the waveform signals to the receiver 12 of the control device 2. The signal processing unit 13 of the control device 2 performs the predetermined processing to the waveform signals acquired through the receiver 12, to acquire waveform data of the ultrasonic waves A and B. Then, for example, with the output timing of the drive signal as the origin and the timing at the maximum of the amplitude (interpolated value) of each ultrasonic wave as the end, the propagation time ta of the ultrasonic wave A and the propagation time tb of the ultrasonic wave B are measured.

After that, the processing proceeds to step S2. The signal processing unit 13 computes the wall thickness H of the laid pipe 20, on the basis of the difference (tb−ta) between the propagation time tb of the ultrasonic wave B and the propagation time ta of the ultrasonic wave A. Specifically, for example, when the speed of an ultrasonic wave that propagates through the laid pipe 20 is defined as v, the wall thickness H of the laid pipe 20 is computed with the following Expression (1). The signal processing unit 13 outputs the calculated wall thickness H of the laid pipe 20 to the storage unit 14 for storage, and additionally outputs the calculated wall thickness H of the laid pipe 20 to the display device 3 for display. Note that, according to the present embodiment, because the difference (tb−ta) between the propagation time tb of the ultrasonic wave B and the propagation time ta of the ultrasonic wave A is acquired, the origin of the temporal axis requires no calibrating.

$$H=(tb-ta)\times v/2 \tag{1}$$

Next, the functional effect of the present embodiment will be described.

According to the present embodiment, because the calibration piece 5 is interposed between the piezoelectric element 4 and the laid pipe 20, the reception timing of the ultrasonic wave A having reflected one time off the bottom face 9 of the calibration piece 5 (in other words, one round trip in the calibration piece 5) is earlier than the reception timing of the ultrasonic wave B having reflected one time off the inner face of the laid pipe 20 (in other words, one round trip in the calibration piece 5 and the laid pipe 20) (refer to FIG. 4). Thus, the ultrasonic wave A and the ultrasonic wave B do not interfere with each other.

According to the present embodiment, the calibration piece 5 includes: the propagation portion 6 through which an ultrasonic wave propagates in the direction along the outer face of the laid pipe 20; and the propagation-direction turn portion 7 at which the propagation direction of the ultrasonic wave turns. Instead of increase of the height of the calibration piece 5 in the direction vertical to the outer face of the laid pipe 20, increase of the length of the calibration piece 5 in the direction parallel to the outer face of the laid pipe 20 enables the propagation time of an ultrasonic wave that makes one round trip in the calibration piece 5, to be longer than the propagation time of an ultrasonic wave that makes one round trip in the laid pipe 20. This arrangement enables the reception timing of an ultrasonic wave C not illustrated having reflected two time off the bottom face 9 of the calibration piece 5 (in other words, two round trips in the calibration piece 5), to be later than the reception timing of the ultrasonic wave B having reflected one time off the inner face of the laid pipe 20. Thus, the ultrasonic wave C does not interfere with the ultrasonic wave B. Therefore, the compatibility between reduction of the ultrasonic sensor 1 in thickness and the accuracy of measurement of the laid pipe 20 in wall thickness, can be achieved with the ultrasonic sensor 1 in which the calibration piece 5 is embedded.

A method of designing the calibration piece 5 according to the present embodiment will be supplemented.

Figure 6:
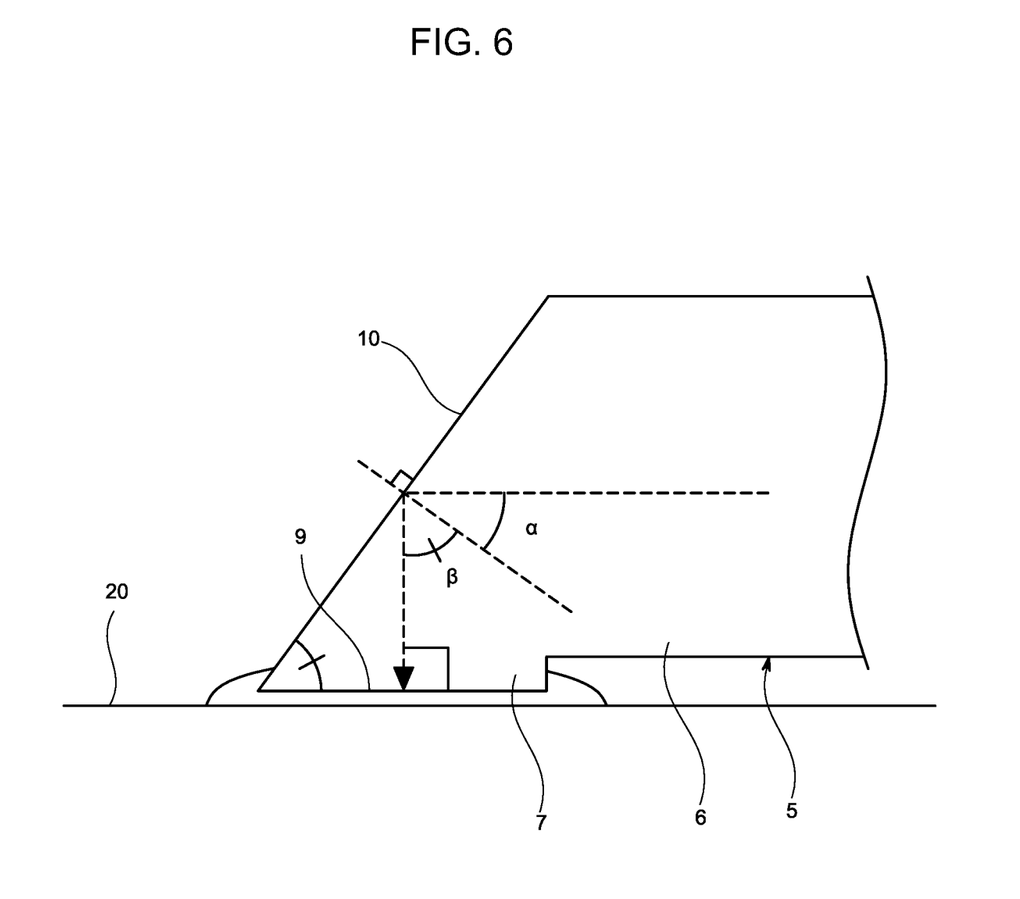
FIG. 6 is an illustration for describing the inclined angle of an inclined face of a propagation-direction turn portion of a calibration piece according to the first embodiment of the present invention.

As illustrated in FIG. 6, the incident angle at which an ultrasonic wave having propagated from the propagation portion 6 to the propagation-direction turn portion 7 of the calibration piece 5 is incident on the inclined face 10, is defined as α, and the reflection angle at which the ultrasonic wave reflects off the inclined face 10 is defined as β. Preferably, the ultrasonic wave having reflected off the inclined face 10 of the propagation-direction turn portion 7 propagates in the direction vertical to the bottom face 9. Thus, preferably, the following expression is satisfied: α+β=90° Therefore, the inclined angle of the inclined face 10 (in detail, the angle between the bottom face 9 and the inclined face 10) is the same as the reflection angle β.

For example, in a case where a longitudinal wave is used as an ultrasonic wave incident on the inclined face 10 and a longitudinal wave is used as an ultrasonic wave that reflects off the inclined face 10, the following expression is satisfied: α=β. Thus, the following expression is satisfied: β=45°.

Meanwhile, for example, in a case where a longitudinal wave is used as an ultrasonic wave incident on the inclined face 10 and a transverse wave is used as an ultrasonic wave that converts after reflecting off the inclined face 10, the inclined angle β is computed with the following Expression (2):

$$\sin(90°-\beta)/\sin\beta = vl/vs \tag{2}$$

where vl represents the speed of a longitudinal wave in the calibration piece 5 and vs represents the speed of a transverse wave in the calibration piece 5.

The speed vl of a longitudinal wave and the speed vs of a transverse wave vary depending on the material of the calibration piece 5. Thus, the inclined angle β varies. In a case where the material of the calibration piece 5 is alumina, the inclined angle β is 31°. In a case where the material of the calibration piece 5 is carbon steel or stainless steel, the inclined angle β is 28°. In a case where the material of the calibration piece 5 is titanium, the inclined angle β is 27°. In a case where the material of the calibration piece 5 is aluminum, the inclined angle β is 26°. In a case where the material of the calibration piece 5 is brass, the inclined angle β is 25°. In a case where the material of the calibration piece 5 is lead, the inclined angle β is 18°.

According to its preliminary study, even when the inclined angle β of the inclined face 10 of the propagation-direction turn portion 7 deviates by approximately ±5° from the optimum value calculated with the above Expression (1), the ultrasonic wave having reflected off the inclined face 10 propagates at a sufficient SN ratio. Thus, for example, in a case where a longitudinal wave is used as an ultrasonic wave incident on the inclined face 10 and a longitudinal wave is used as an ultrasonic wave that reflects off the inclined face 10, the inclined angle β may be 50°. For example, in a case where a longitudinal wave is used as an ultrasonic wave incident on the inclined face 10 and a transverse wave is used as an ultrasonic wave that reflects off the inclined face 10 and in a case where the material of the calibration piece 5 is lead, the inclined angle β may be 13°. Therefore, the inclined angle β is in a range of 13° to 50°.

As illustrated in FIG. 2, the one-way propagation distance of an ultrasonic wave between the piezoelectric element 4 and the inclined face 10 of the calibration piece 5 (here, the central position of the inclined face 10 in the height direction and the length direction of the calibration piece 5 is defined as a representative position, and the same applies hereinafter) is defined as L1, and the one-way propagation distance of an ultrasonic wave between the inclined face 10 and the bottom face 9 of the calibration piece 5 is defined as L2. Thus, the one-way propagation distance of an ultrasonic wave in the calibration piece 5 is expressed as (L1+L2). In other words, the one-way propagation distance of an ultrasonic wave in the calibration piece 5 is expressed as (the length of the propagation portion 6+(the length of the propagation-direction turn portion 7)/2+(the height of the propagation-direction turn portion 7)/2).

Because L2 is small, the following expression is assumed: L2=0. If a longitudinal wave is used as an ultrasonic wave that propagates between the piezoelectric element 4 and the inclined face 10 of the calibration piece 5, the one-way propagation time of an ultrasonic wave in the calibration piece 5 is expressed as L1/vl. Meanwhile, if a transverse wave is used as an ultrasonic wave that propagates between the piezoelectric element 4 and the inclined face 10 of the calibration piece 5, the one-way propagation time of an ultrasonic wave in the calibration piece 5 is expressed as L1/vs. The one-way propagation time of an ultrasonic wave in the laid pipe 20 is expressed as H/v.

Therefore, if a longitudinal wave is used as an ultrasonic wave that propagates between the piezoelectric element 4 and the inclined face 10 of the calibration piece 5, for satisfaction of the following relationship: the propagation time of an ultrasonic wave that makes two round trips in the calibration piece 5>the propagation time of an ultrasonic wave that makes one round trip in the calibration piece 5 and the laid pipe 20 (namely, the one-way propagation time of an ultrasonic wave in the calibration piece 5>the one-way propagation time of an ultrasonic wave in the laid pipe 20), preferably, the following condition is satisfied: L1>H×vl/v. Meanwhile, if a transverse wave is used as an ultrasonic wave that propagates between the piezoelectric element 4 and the inclined face 10 of the calibration piece 5, for satisfaction of the above relationship, preferably, the following condition is satisfied: L1>H×vs/v. From such a viewpoint, preferably, a condition in which the length of the propagation portion 6 in the left and right direction in FIGS. 2 and 3 is larger than H×vl/v, is satisfied or a condition in which the length of the propagation portion 6 is larger than H×vs/v, is satisfied. In general, the following expression is satisfied: vl<vs. Thus, if the latter condition is satisfied, the former condition is satisfied.

Note that, referring to FIG. 4, with a longitudinal wave as an ultrasonic wave that propagates between the piezoelectric element 4 and the inclined face 10 of the calibration piece 5 and a transverse wave as an ultrasonic wave that propagates between the inclined face 10 and the bottom face 9 of the calibration piece 5, the material of the calibration piece 5 is aluminum, and the inclined angle β is set at 26°. The material of the laid pipe 20 is carbon steel, and the wall thickness H of the laid pipe 20 is set at 8 mm. The length of the propagation portion 6 of the calibration piece 5 is set at 13 mm.

A second embodiment of the present invention will be described with FIGS. 7, 8A, and 8B. Note that, according to the present embodiment, constituents equivalent to those in the first embodiment are denoted with the same reference signs, and the descriptions thereof will be appropriately omitted.

Figure 7:
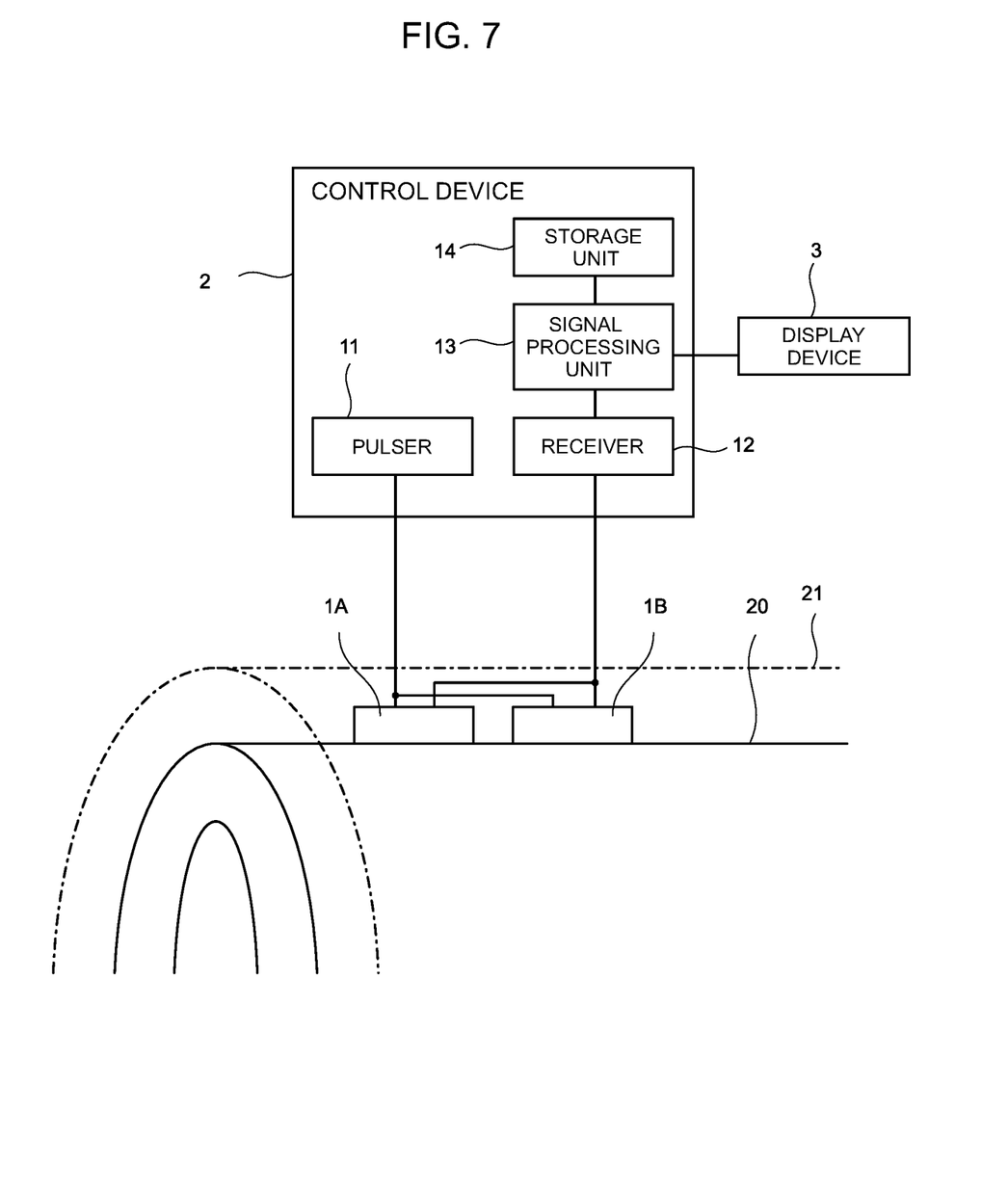
FIG. 7 is a schematic illustration of the configuration of an ultrasonic inspection system according to a second embodiment of the present invention, together with a laid pipe that is a subject.
Figure 8A:
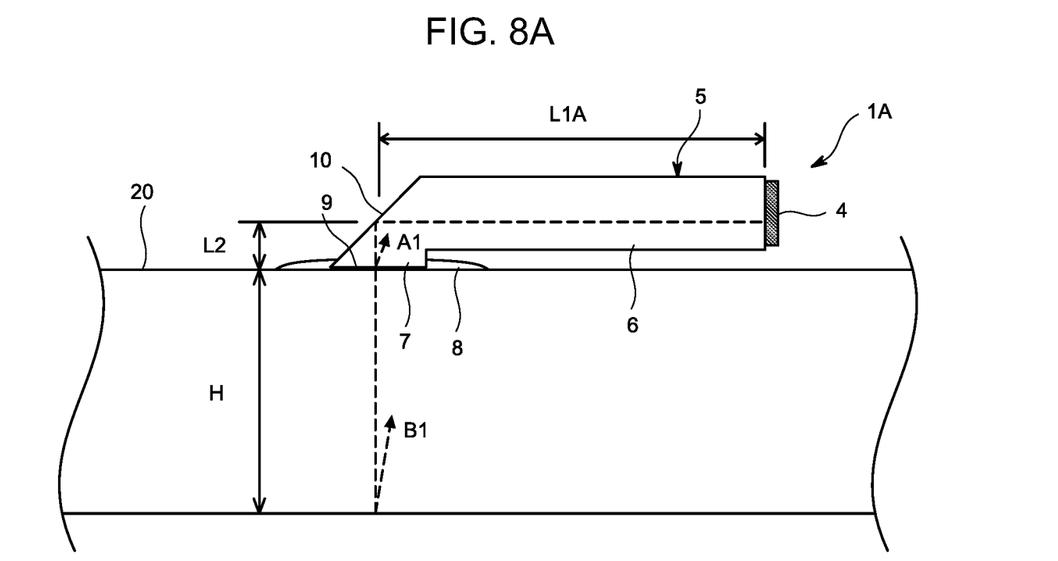
FIGS. 8A and 8B are sectional views of the structures of ultrasonic sensors according to the second embodiment of the present invention.
Figure 8B:
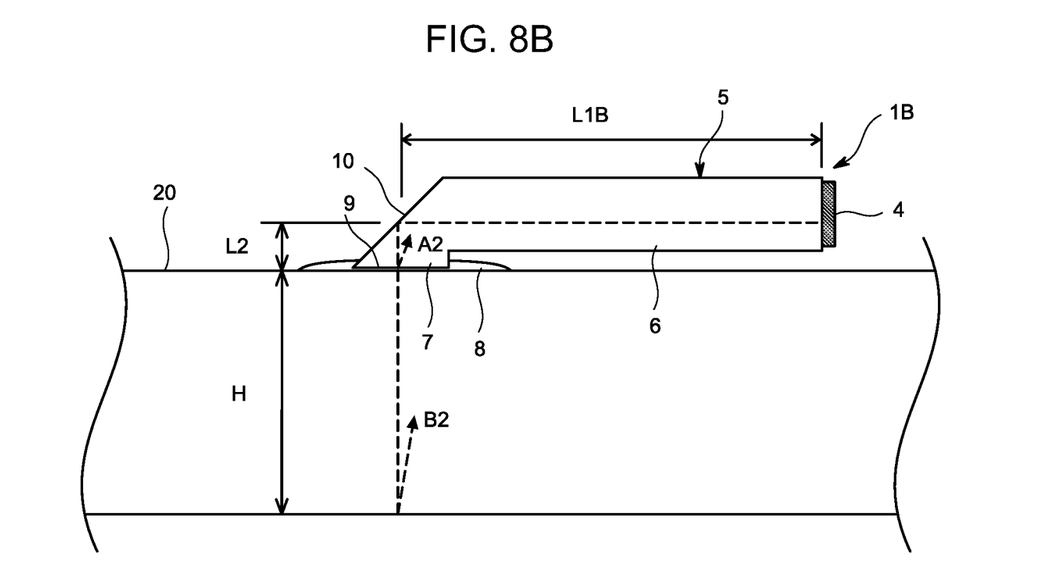

FIG. 7 is a schematic illustration of the configuration of an ultrasonic inspection system according to the present embodiment, together with a laid pipe that is a subject. FIGS. 8A and 8B are sectional views of the structures of ultrasonic sensors according to the present embodiment.

The ultrasonic inspection system according to the present embodiment includes a pair of the ultrasonic sensors 1A and 1B, a control device 2, and a display device 3. The ultrasonic sensors 1A and 1B each include a piezoelectric element 4 and a calibration piece 5, similarly to the ultrasonic sensor 1 according to the first embodiment.

A pulser 11 of the control device 2 outputs drive signals, simultaneously, to the respective piezoelectric elements 4 of the ultrasonic sensors 1A and 1B. The piezoelectric element 4 of the ultrasonic sensor 1A vibrates in the thickness direction thereof due to the drive signal from the pulser 11 of the control device 2, to transmit an ultrasonic wave to the calibration piece 5. The piezoelectric element 4 receives an ultrasonic wave A1 having reflected one time off a bottom face 9 of the calibration piece 5 as indicated with arrow A1 in FIG. 8A and an ultrasonic wave B1 having reflected one time off the inner face of the laid pipe 20 as indicated with arrow B1 in FIG. 8A. Then, the piezoelectric element 4 converts the received ultrasonic waves A1 and B1 into waveform signals, and outputs the waveform signals to a receiver 12 of the control device 2.

The piezoelectric element 4 of the ultrasonic sensor 1B vibrates in the thickness direction thereof due to the drive signal from the pulser 11 of the control device 2, to transmit an ultrasonic wave to the calibration piece 5. The piezoelectric element 4 receives an ultrasonic wave A2 having reflected one time off a bottom face 9 of the calibration piece 5 as indicated with arrow A2 in FIG. 8B and an ultrasonic wave B2 having one time reflected off the inner face of the laid pipe 20 as indicated with arrow B2 in FIG. 8B. Then, the piezoelectric element 4 converts the received ultrasonic waves A2 and B2 into waveform signals, and outputs the waveform signals to the receiver 12 of the control device 2.

Here, according to the present embodiment, the propagation time of the ultrasonic wave A1 that makes one round trip in a propagation portion 6 and a propagation-direction turn portion 7 of the calibration piece 5 of the ultrasonic sensor 1A, is different from the propagation time of the ultrasonic wave A2 that makes one round trip in a propagation portion 6 and a propagation-direction turn portion 7 of the calibration piece 5 of the ultrasonic sensor 1B. Specifically, for example, the one-way propagation distance L1A of an ultrasonic wave between the piezoelectric element 4 and an inclined face 10 of the calibration piece 5 in the ultrasonic sensor 1A, is different from the one-way propagation distance L2A of an ultrasonic wave between the piezoelectric element 4 and an inclined face 10 of the calibration piece 5 in the ultrasonic sensor 1B. This arrangement allows the receiver 12 of the control device 2 to receive the waveform signals of the ultrasonic waves A1, A2, B1, and B2 at different timings.

A signal processing unit 13 of the control device 2 performs predetermined processing to the waveform signals sequentially received through the receiver 12, to acquire waveform data of the ultrasonic waves A1, A2, B1, and B2. Then, for example, with the output timing of the drive signals as the origin and the timing at the maximum of the amplitude (interpolated value) of each ultrasonic wave as the end, the propagation time of the ultrasonic wave A1, the propagation time of the ultrasonic wave A2, the propagation time of the ultrasonic wave B1, and the propagation time of the ultrasonic wave B2 are measured. Note that the signal processing unit 13 stores four gates corresponding to the expected range of the propagation time of the ultrasonic wave A1, the expected range of the propagation time of the ultrasonic wave A2, the expected range of the propagation time of the ultrasonic wave B1, and the expected range of the propagation time of the ultrasonic wave B2, in advance. The signal processing unit 13 discriminates between the ultrasonic waves A1, A2, B1, and B2 with the gates.

The signal processing unit 13 of the control device 2 computes the wall thickness H of the laid pipe 20 at the position of the ultrasonic sensor 1A, on the basis of the difference between the propagation time of the ultrasonic wave B1 and the propagation time of the ultrasonic wave A1. The signal processing unit 13 computes the wall thickness H of the laid pipe 20 at the position of the ultrasonic sensor 1B, on the basis of the difference between the propagation time of the ultrasonic wave B2 and the propagation time of the ultrasonic wave A2. The signal processing unit 13 outputs the calculated wall thicknesses H of the laid pipe 20, to a storage unit 14 for storage, and additionally outputs the calculated wall thicknesses H of the laid pipe 20, to the display device 3 for display.

According to the present embodiment as described above, similarly to the first embodiment, the compatibility between reduction of the ultrasonic sensors 1A and 1B in thickness and the accuracy of measurement of the laid pipe 20 in thickness, can be achieved with the ultrasonic sensors 1A and 1B each including the calibration piece 5 embedded therein. According to the present embodiment, although the transmission timings of the drive signals from the control device 2 to the piezoelectric elements 4 of the ultrasonic sensors 1A and 1B are the same, the reception timings of the waveform signals of the ultrasonic waves A1, A2, B1, and B2 are different in the control device 2. This arrangement enables improvement of the accuracy of measurement of the laid pipe 20 in thickness with reduction of the number of control devices 2 and shortening of inspection time.

Note that, in the second embodiment, the example in which the ultrasonic inspection system includes the two ultrasonic sensors 1A and 1B has been described. However, the ultrasonic inspection system according to the second embodiment is not limited to this. Thus, modifications may be made without departing from the scope of the spirit and technical idea of the present invention. That is, the ultrasonic inspection system may include three ultrasonic sensors or more. The respective calibration pieces of the three ultrasonic sensors or more may be different in the propagation time of an ultrasonic wave that makes one round trip in the propagation portion and the propagation-direction turn portion.

What is claimed is:

1. An ultrasonic inspection system comprising:
an ultrasonic sensor including: a piezoelectric element configured to perform ultrasonic transmission and reception; and a calibration piece interposed between the piezoelectric element and a subject; and
a control device configured to compute a thickness of the subject, based on a difference between an ultrasonic propagation time of one round trip in the calibration piece and the subject and an ultrasonic propagation time of one round trip in the calibration piece, wherein the calibration piece includes:
a propagation portion extending along a surface of the subject, the propagation portion having the piezoelectric element adhering to an end face on one side in a direction in which the propagation portion extends; and
a propagation-direction turn portion formed on another side in the direction in which the propagation portion extends, the propagation-direction turn portion having a bottom face in contact with the surface of the subject through a contact medium and an inclined face inclining with respect to a direction vertical to the surface of the subject,
an ultrasonic wave having propagating from the piezoelectric element to the propagation-direction turn portion through the propagation portion, reflects off the inclined face to propagate to the bottom face, and
from the ultrasonic wave having reached the bottom face, a partial ultrasonic wave having reflected off the bottom face and a partial ultrasonic wave having made one round trip in the subject through the bottom face, reflect off the inclined face to propagate to the propagation portion,
the calibration piece is provided such that the ultrasonic propagation time of one round trip in the calibration piece is longer than an ultrasonic propagation time of one round trip in the subject.

2. An ultrasonic inspection system comprising:
an ultrasonic sensor including: a piezoelectric element configured to perform ultrasonic transmission and reception; and a calibration piece interposed between the piezoelectric element and a subject; and
a control device configured to compute a thickness of the subject, based on a difference between an ultrasonic propagation time of one round trip in the calibration piece and the subject and an ultrasonic propagation time of one round trip in the calibration piece, wherein the calibration piece includes:
a propagation portion extending along a surface of the subject, the propagation portion having the piezoelectric element adhering to an end face on one side in a direction in which the propagation portion extends; and
a propagation-direction turn portion formed on another side in the direction in which the propagation portion extends, the propagation-direction turn portion having a bottom face in contact with the surface of the subject through a contact medium and an inclined face inclining with respect to a direction vertical to the surface of the subject,
an ultrasonic wave having propagating from the piezoelectric element to the propagation-direction turn portion through the propagation portion, reflects off the inclined face to propagate to the bottom face, and
from the ultrasonic wave having reached the bottom face, a partial ultrasonic wave having reflected off the bottom face and a partial ultrasonic wave having made one round trip in the subject through the bottom face, reflect off the inclined face to propagate to the propagation portion,
a plurality of the ultrasonic sensors is provided, and
the respective calibration pieces of the plurality of the ultrasonic sensors are different in the ultrasonic propagation time of one round trip in the calibration piece.

* * * * *